Sept. 25, 1956     R. R. PULLEN     2,764,391
HEAT SAVING UNIT
Filed March 5, 1954
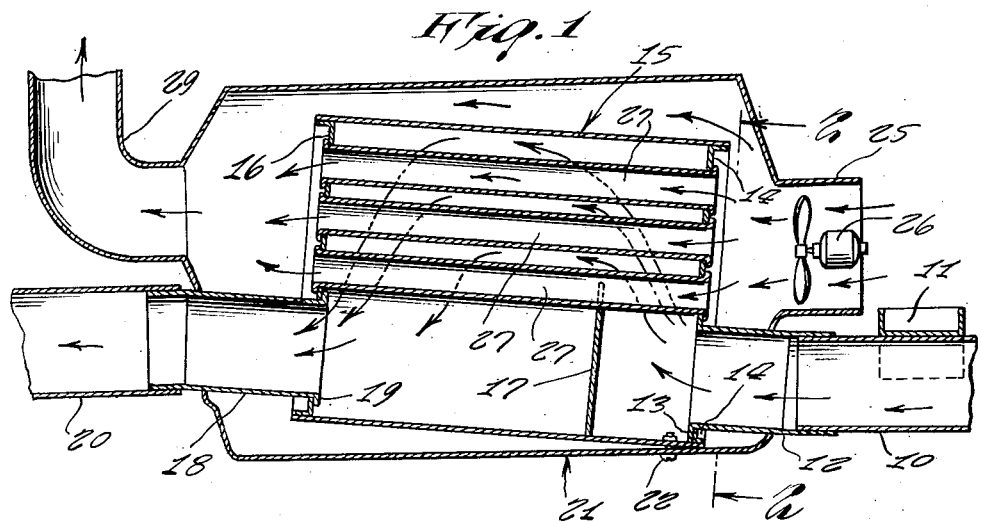
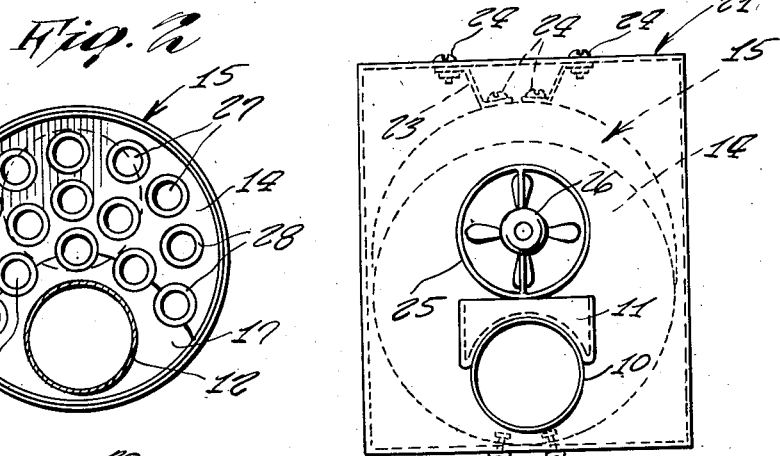
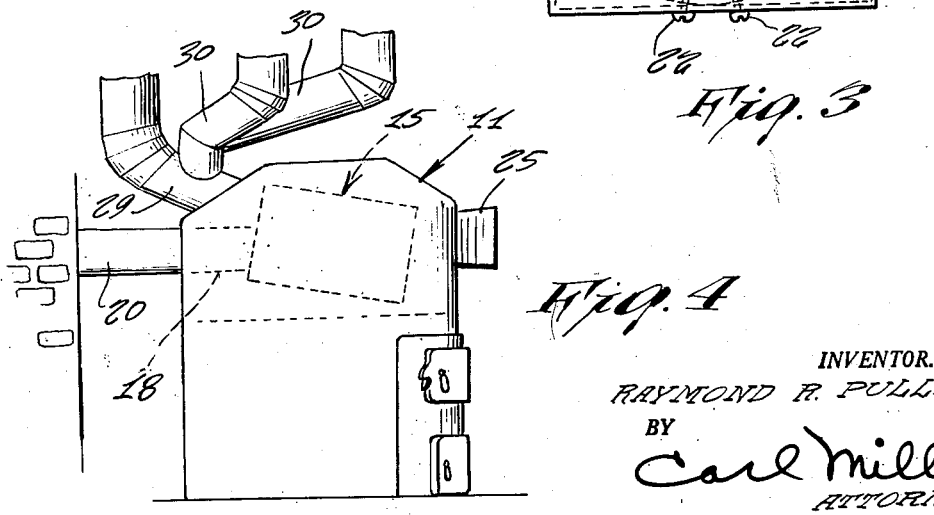
INVENTOR.
RAYMOND R. PULLEN
BY Carl Miller
ATTORNEY

United States Patent Office 2,764,391
Patented Sept. 25, 1956

2,764,391
HEAT SAVING UNIT
Raymond R. Pullen, Rumson, N. J.
Application March 5, 1954, Serial No. 414,303
1 Claim. (Cl. 257—166)

This invention relates to heat saving units.

It is an object of the present invention to provide a heat saving unit which will collect and utilize the waste heat that would have otherwise gone up the chimney, the device utilizing over one-half of waste heat of a furnace.

It is another object of the present invention to provide a unit of the above type which will raise the temperature of the rooms to be heated more quickly, shortening the length of time that the burner is in operation, heat travelling from the device up to the rooms is less than two minutes, as compared with a much longer period required by the radiators to heat from steam and considerably longer from hot water.

It is another object of the present invention to provide a device of the above type which will prevent moisture from accumulating in the cellar and which may be used in warm weather as an air conditioner, circulating cool air from the cellar.

For other objects and a better understanding of the invention, reference may be had to the following detailed description taken in connection with the accompanying drawing, in which:

Figure 1 is a longitudinal sectional view through the device;

Fig. 2 is a cross sectional view taken along the line 2—2 of Fig. 1;

Fig. 3 is an end elevational view thereof looking from the right of Fig. 1 and

Fig. 4 is a perspective view showing the device incorporated into a hot air furnace.

Referring now more in detail to the drawing, 10 represents a flue from the furnace 11 normally employed to carry off smoke, gases and waste hot air to the chimney. A humidifier pan containing water 11 is suitably mounted above the flue 10. An intake pipe 12 is suitably connected to the outlet end of the flue 10, the outlet end of the pipe 12 being formed with a flange 13 by means of which it is suitably secured to the inlet end 14 of a heat collector drum 15, the pipe 12 and drum 15 being inclined upwardly as shown. The drum 15 is provided with an outlet end wall 16. The drum 15 is provided with a circular baffle plate 17 which directs the gases from flue 10 and pipe 12 upwardly to the top of the drum. An outlet pipe 18 is provided at its inner end with a flange 19 by means of which it is suitably secured to the end wall 16 at the bottom thereof, the outlet end of pipe 18 being received within and suitably secured to a flue 20 which conducts the gases and smoke to the chimney. Thus, the gases, as they pass from the furnace to the chimney will be directed upwardly within the heat collector drum 15.

A jacket 21 surrounds the heat collector drum 15 being provided with an inlet opening which receives therethrough the intake pipe 12 and an outlet opening which receives therethrough the outlet pipe 18. A pair of bolts 22 serve to secure the inlet end of the jacket to the heat collector drum 15, the upper outlet end of the jacket being secured to the heat collector drum 15 by the brackets 23 and bolts 24 (Fig. 3). The inlet end of the jacket 21 at the center thereof is provided with a cylindrical inlet chamber 25 within which is positioned a fan 26 adapted to blow air from the cellar through the jacket in the manner shown by the solid arrows of Fig. 1. To insure intimate heat exchange between the air from inlet 25 and the smoke and gases from the furnace, a plurality of collector tubes 27 are mounted on opposite ends in the end walls 14 and 16 of the heat collector drum 15, the upper edge of the baffle 17 being provided with a plurality of radially spaced, semicircular cutouts (Fig. 2) accommodating the lowermost collector tubes 27. The tubes 27 may be provided at each end with the flanges 28 to facilitate their securement to the end walls 14 and 16. The outlet end of the jacket 21 is provided with an outlet pipe 29 which is adapted to deliver the heated air passing through the collector tubes 27 to the various rooms of the house. Branches 30 communicating with the outlet pipe 29 may be provided for a multi-room heating system. It will be noted that the heat collector drum is higher on the outlet and lower on the inlet end which prevents, heat, smoke and gases from being pocketed therewithin. The heat, smoke and gases will hit the top of the heat collector drum 15, take a downward course between the tubes 27 and exit through the outlet pipe 18 which leads to the chimney. The tubes 27 are substantially parallel to each other within the drum 15. When the fan 26 is in operation, it will draw heat from the pipe 10, forcing hot air through the heat collector tubes 27 as well as through the space intermediate the drum 15 and the jacket 21. The drawing shows fifteen such heat collector tubes 27 being provided although any suitable number may be employed.

The invention may be installed near the furnace 11 and attached to the ceiling by metal straps, thus holding it in a firm position. When in operation, the heat that travels through the collector tubes 27 is removed from the smoke and gases, and fresh hot air will be circulated to the rooms by means of the fan 26. When the furnace stops, and the fan 26 ceases to operate, any heat that remains in the unit, furnace or cellar will continue to flow due to convection. By use of this system, the circulating air will prevent moisture from accumulating in the cellar.

By turning off the furnace 10 during the summer, the unit may be used in hot weather as an air conditioner. The fan 26 would then drive cool air from the cellar through the collector tubes 27 to the heat outlet pipe 29 and on to the rooms and register.

While various changes may be made in the detail construction, it shall be understood that such changes shall be within the spirit and scope of the present invention, as defined by the appended claim.

Having thus set forth and disclosed the nature of my invention, what is claimed is:

A heat saving unit comprising a furnace, a heat collecting drum having a front end wall and a rear end wall, and a chimney, a plurality of flue pipes disposed between said furnace and said chimney, said heat collecting drum being of substantially greater diameter than and disposed between said flue pipes in communication with the latter, a plurality of collector tubes piercing said front and rear end walls of said drum and disposed substantially parallel with said flue pipes, a jacket surrounding said drum and communicating with the inlets and outlets of said collector tubes, baffle means disposed crosswise in said drum in the path of the flue gases directing the latter towards and parallel to said collector tubes, a fan mounted within the inlet of said jacket to draw air through said collector tubes, and an outlet pipe at the outlet of said jacket communicating with the outlets of said collector tubes, so that the air forced through the latter is heated by the flue gases surrounding and flowing parallel to said collector tubes.

References Cited in the file of this patent
UNITED STATES PATENTS

| | | |
|---|---|---|
| 996,047 | Bate | June 27, 1911 |
| 1,292,615 | Koenig | Jan. 28, 1919 |
| 1,689,067 | Benner | Oct. 23, 1928 |
| 2,002,019 | Marzolf | May 21, 1935 |